United States Patent [19]

Schmid et al.

[11] 4,101,476
[45] Jul. 18, 1978

[54] PROCESS FOR THE MANUFACTURE OF CRYSTALLINE, CROSSLINKED, ELASTOMERIC EPOXIDE RESINS

[75] Inventors: Rolf Schmid, Gelterkinden; Ursula Kreibich, Riehen, both of Switzerland

[73] Assignee: Ciba-Geigy Corporation, Ardsley, N.Y.

[21] Appl. No.: 828,441

[22] Filed: Aug. 29, 1977

Related U.S. Application Data

[63] Continuation-in-part of Ser. No. 680,265, Apr. 26, 1976, abandoned.

[30] Foreign Application Priority Data

Apr. 28, 1975 [CH] Switzerland .................. 5443/75

[51] Int. Cl.$^2$ .................. C08L 91/00; C08L 63/00
[52] U.S. Cl. .................. 260/22 EP; 260/22 D; 260/835; 528/297
[58] Field of Search .................. 260/835, 22 D, 22 EP

[56] References Cited

U.S. PATENT DOCUMENTS

| 3,278,636 | 10/1968 | Wynstra | 260/22 D |
|---|---|---|---|
| 3,557,035 | 1/1971 | Schmid | 260/22 EP |
| 3,557,036 | 1/1971 | Schmid | 260/22 EP |
| 3,641,194 | 2/1972 | Schmid | 260/835 |
| 3,642,674 | 2/1972 | Schmid | 260/22 D |
| 3,642,938 | 2/1972 | Schmid | 260/22 EP |
| 3,655,817 | 4/1972 | Lohse | 260/22 D |
| 3,739,041 | 6/1973 | Schmid | 260/835 |
| 3,816,365 | 6/1974 | Schmid | 260/22 D |
| 3,937,751 | 2/1976 | Schmid | 260/835 |
| 3,979,477 | 9/1976 | Schmid | 260/835 |
| 3,985,825 | 10/1976 | Schmid | 260/835 |

FOREIGN PATENT DOCUMENTS

| 1,931,292 | 1/1970 | Fed. Rep. of Germany | 260/835 |
|---|---|---|---|
| 1,182,728 | 3/1970 | United Kingdom | 260/835 |
| 1,225,945 | 3/1971 | United Kingdom | 260/835 |

*Primary Examiner*—Paul Lieberman
*Attorney, Agent, or Firm*—Vincent J. Cavalieri

[57] ABSTRACT

The invention relates to the manufacture of crystalline epoxide resins which exhibit a marked crystallite melt temperature. The formation of the crystallites is caused by molecule blocks which are derived from polyester-polycarboxylic acids, which contain aliphatic radicals in the chain. According to the invention, two aliphatic polyester-polycarboxylic acids (A and B) are reacted under very specific quantitative conditions with epoxide compounds which contain at least 2 epoxide groups and optionally with curing agents. The polyester-polycarboxylic acids A are purely n-aliphatic in character, whereas the polyester-polycarboxylic acids B are not. They contain radicals which are derived from dimerized mono- unsaturated or di- unsaturated fatty acids during the ester formation. These crystalline synthetic resins are particularly suitable for use as material for absorbing solar energy in solar energy collectors.

20 Claims, No Drawings

PROCESS FOR THE MANUFACTURE OF CRYSTALLINE, CROSSLINKED, ELASTOMERIC EPOXIDE RESINS

This application is a continuation-in-part application of our pending application Ser. No. 680,265, filed Apr. 26, 1976 now abandoned.

The invention relates to crystalline, crosslinked, elastomeric epoxide resins, in which the flexible and rigid blocks essentially consist of aliphatic molecule chains and which are distinguished by their special morphological properties. In the present document and in accordance with the present invention, a crystalline epoxide resin is to be understood as a product which is usually partially crystalline.

Various epoxide resins, all of which contain, as crystallites, the radicals of a long-chain aliphatic polyester-polycarboxylic acid, are already known. In this connection, British Pat. Nos. 1,164,584 and 1,283,653 should be mentioned in particular. These products are crystalline synthetic resins which, because they can be stretched, exhibit very high elongations at break at room temperature. If they are warmed to a temperature above the crystallisation transition temperature, they then exhibit soft rubbery-elastic properties and have only a low mechanical strength. However, they exhibit a relatively low reversible extensibility and, at the same time, fairly high modulus values. Because of these properties, which manifest themselves in the form of stiffness and brittleness, these resins are less suitable as materials for use together with a material of a different type, for example for laminates with glass, metal, carbon, plastics of a different type, and the like (especially in the form of fibres). Particularly in the case of their use for potting, for example around glass or metal, with which it is not possible to avoid a certain amount of thermal cycling, considerable dilatation stresses result which, when the casting is cooled, lead to a disadvantageous permanent deformation or even to the formation of cracks.

In discussing the prior art, attention is also now drawn to U.S. patent specification 3,979,477, which likewise relates to crosslinked epoxide resins in the manufacture of which long-chain aliphatic polyester carboxylic acids, among others, are likewise used. These polyester dicarboxylic acids are either unsubstituted or substituted. If they are unsubstituted, they are distinguished by crystallinity. Polyester dicarboxylic acids of the formula

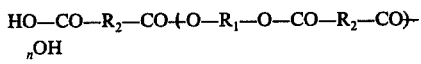

wherein $R_1$ and $R_2$ primarily represent or contain annular molecular radicals, are also additionally used in the manufacture of these crosslinked epoxide resins. In principle, however, $R_1$ and $R_2$ in the above formula can also represent divalent aliphatic radicals, whilst at least one of these two radicals must contain a carbocyclic or heterocyclic ring or such a ring system. Furthermore, the possible total amount of the aliphatic moleculare components in $R_1$ and $R_2$ is greatly restricted. The cumulation thus produced overall of the annular molecular radicals in these polyester dicarboxylic acids causes them to be rigid (non-flexible). The degree of rigidity is so great that a formation of crystallinity of the resultant crosslinked epoxide resins is virtually prevented because of the above-mentioned crystalline long-chain aliphatic dicarboxylic acids. The epoxide resins of U.S. Pat. No. 3,979,477 are therefore virtually amorphous and not crystalline.

The object of the invention is to provide crystalline, elastomeric epoxide resins which, down to relatively low temperatures, do not exhibit these adverse properties of the plastics according to the British Pat. Nos. 1,164,584 and 1,283,655 discussed above. They must, therefore, exhibit a greater reversible extensibility and lower moduli and these properties should be retained up to relatively high temperatures and, at the same time, down to temperatures which are as low as possible. By means of these desired properties it would then be possible to avoid heat-dependent dilatation stresses in connection with the other type of material in a laminate and to avoid increased formation of cracks which is associated therewith.

The subject of the invention is a process for the manufacture of crystalline, crosslinked, elastomeric epoxide resins, which is characterised in that epoxide compounds, containing two or more epoxide groups, are reacted a. with polyester-polycarboxylic acids A which essentially contain segments of the formula I

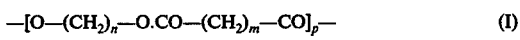

in which $n$ and $m$ are identical or different and denote 2 or a higher number than 2, and to which the condition $n + m = 6$ to 30 applies, and in which $p$ denotes a number from 2 to 40 which, however, is sufficiently large that the segment contains at least 30 —$CH_2$— groups, and b. with polyester-polycarboxylic acids B which essentially contain segments of the formula II

in which $R^1$ denotes an alkylene radical with at least 2 C atoms in the chain, in which $R^2$ denotes a radical which is derived from a dimerised mono- unsaturated or di-unsaturated fatty acid, and in which, per O bridge, an average of at least 3.5 and at most 30 C atoms, without taking into account the C atoms of the —CO.O— radicals, are present in the chain, and in which $q$ denotes a number from 2 to 40, which, however, is sufficiently large that the segment contains at least 30 C atoms, without taking into account the C atoms of the —CO.O— radicals, in the chain, and c. if appropriate, with curing agents C, and, if appropriate, in the presence of accelerators, in a ratio such that 0.5 to 1.2 equivalents of polyyester-polycarboxylic acid are present per equivalent of epoxide compound, that 1/10 to 9/10 of these 0.5 to 1.2 equivalents are attributable to the polyester-polycarboxylic acid A and the remaining 9/10 to 1/10 to the polyester-polycarboxylic acid B, and that up to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential.

Preferably, the condition $n + m = 6$ to 24 applies to the formula I.

In the epoxide resins obtained according to the invention, the radicals of the polyester-polycarboxylic acids A represent the rigid molecule blocks and are in the form of crystallites with crystallite melting points between 40° and 120° C. The radicals of the polyester-polycarboxylic acids B, on the other hand, are incorporated as flexible blocks in the crosslinked molecule and in practice these form the matrix in which the crystallites are incorporated. It is particularly surprising that a relatively large proportion of the polyester-polycarboxylic acids B, that is to say up to 9/10 of the total amount of polyester-polycarboxylic acid employed, can be incorporated in the crosslinked epoxide resin without this resulting in crystallisation being prevented.

Preferably, the procedure followed according to the invention is such that 0.7 to 1.2, especially 0.9 to 1.1, equivalents of polyester-carboxylic acid are present per equivalent of epoxide compound.

The polyester-polycarboxylic acids A and B used in the reaction can for practical purposes be manufactured by the same basic process, by esterification of corresponding aliphatic dialocohols and aliphatic dicarboxylic acids or dimerised mono-unsaturated or di-unsaturated fatty acids. However the esterification can also be carried out between suitable derivatives of these alcohols and dicarboxylic acids, such as, for example, the anhydrides, acid chlorides and the like. The dicarboxylic acids must be present in excess.

Where minor amounts of aliphatic polyalcohols with at least 3 OH groups, especially glycerol, are also used, branched, that is to say at least 3-functional, polyester-polycarboxylic acids A and B are obtained. The use of the latter in the reaction according to the invention is also a preferred form of the invention. Branched polyester-polycarboxylic acids A and B which are obtained if small amounts of polycarboxylic acids, or their anhydrides, with at least 3 carboxyl groups (such as, for example, trimellitic acid) are also present during the manufacture of the polyester-polycarboxylic acids, are equally suitable for the reaction according to the invention.

Examples of dimerised mono-unsaturated or di-unsaturated fatty acids for the production of polyester-polycarboxylic acids B are the known dicarboxylic acids which are formed by dimerisation of linoleic acid or of ricinoleic acid.

The basic rules for the manufacture of the polyester-polycarboxylic acids A and B used according to the present invention in other respects entirely correspond to those which have to be observed for the manufacture of the "long-chain dicarboxylic acids" employed according to British Pat. No. 1,164,584, and which are described in detail in this British patent. Further data on the basic principles of the manufacture of such long-chain, aliphatic polyester-polycarboxylic acids are also to be found in a publication by Hans Batzer et al. in "Die Angewandte Makromolekulare Chemie" 1973, page 349–412.

Examples of suitable polyester-polycarboxylic acids A are those based on the following polyalcohols and polycarboxylic acids:

16 mols of adipic acid - 15 mols of hexane-1,6-diol
21 mols of succinic acid - 20 mols of butane-1,1-diol
11 mols of sebacic acid - 10 mols of hexane-1,6-diol
Glycerol - succinic acid - butanediol (1:24:21)
11 mols of succinic acid - 10 mols of butanediol
11 mols of dodecanedicarboxylic acid - 10 mols of hexanediol
11 mols of dodecanedicarboxylic acid - 10 mols of butanediol
11 mols of dodecanedicarboxylic acid - 10 mols of propane-1,3-diol
7 mols of dodecanedicarboxylic acid - 6 mols of hexanediol
7 mols of dodecanedicarboxylic acid - 6 mols of dodecanediol
7 mols of sebacic acid - 6 mols of dodecanediol
11 mols of sebacic acid - 6 mols of dodecanediol
Trimethylhexanediol - succinic anhydride - butanediol (1:30:27)
11 mols of dodecanedicarboxylic acid - 10 mols of ethylene glycol
5 mols of decanedicarboxylic acid - 4 mols of dodecanediol
11 mols of decanedicarboxylic acid - 10 mols of hexanediol Examples of suitable polyester-polycarboxylic acids B are those based on the following polyalcohols and polycarboxylic acids:

4 mols of dimerised fatty acid - 3 mols of diethylene glycol
4 mols of dimerised fatty acid - 3 mols of hexanediol
3 mols of dimerised fatty acid - 2 mols of hexanediol Preferred polyester-polycarboxylic acids B are e.g. those which contain, as $R^2$ in formula II, a radical of the formula IV

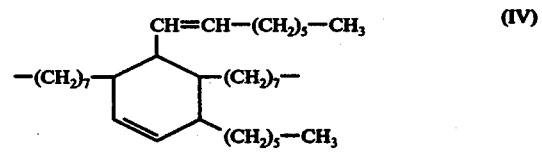

As epoxide compounds containing two or more epoxide groups it is possible to employ practically all the polyepoxy compounds known, to those skilled in the art, from publications and patent specifications. According to the invention, one or more different epoxide compounds can be reacted. Triglycidyl isocyanurate and triglycidyl compounds which contain one or more hydantoin groups and/or dihydrouracil groups, especially epoxide compounds of the formula III

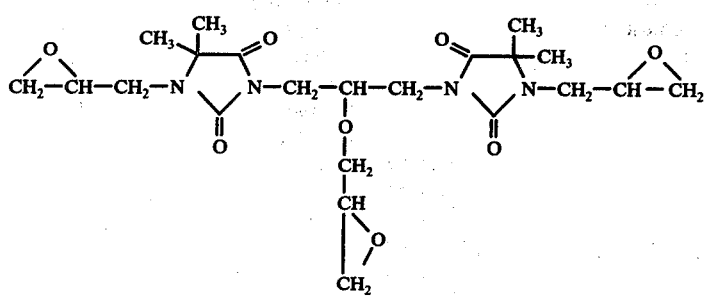

are particularly suitable.

In principle, the reaction according to the invention can be carried out either in 1 stage or in several stages. If the epoxide compounds used have at least 3 epoxide groups, and polyester-dicarboxylic acids A and B are employed, it is possible, for example, to carry out the reaction in 1 stage, that is to say to start from a reaction mixture which contains all the reactants simultaneously. It is possible to proceed in exactly the same way (that is to say in 1 stage) if, instead of the dicarboxylic acids, polyester-polycarboxylic acids A and B which have at least 3 carboxyl groups are employed. In the converse case, that is to say when using polyester-carboxylic acids A and B containing at least 3 carboxyl groups, and using diepoxy compounds, working in 1 stage is again possible and is the normal method of reaction for such cases.

If only diepoxy compounds and only polyester-dicarboxylic acids are employed, it is only possible to work in one stage if an excess of epoxide compounds is used and at the same time a polycarboxylic acid anhydride is added.

In the multi-stage method, an adduct containing epoxide groups is initially manufactured, in a first stage, from the epoxide compounds and the polyester-polycarboxylic acids A and/or B, preferably using 0.5 to 1 equivalent of polyester-polycarboxylic acid per 2 equivalents of epoxide compounds. In a second reaction stage, the crosslinking is then carried out, by reaction of the adducts with the remainder of the polyester-polycarboxylic acids A and/or B. It is also possible to proceed by carrying out the crosslinking in the second stage in the presence of customary curing agents. It is also possible additionally to add yet further monomeric epoxide compounds and correspondingly larger amounts of curing agents.

As customary curing agents for epoxide resins it is possible to employ all the substances which are described in the numerous publications and patents relating to epoxide resins. Inter alia, the following substances may be listed here: compounds with amino groups, polyalcohols, polycarboxylic acids and their anhydrides, acid amides, polyesters, phenol-formaldehyde condensates and amino-resin precondensates. Tertiary amines and imidazoles may be mentioned as examples of suitable accelerators.

The reaction according to the invention is preferably carried out in the melt. For this, preferably temperatures of between 50° and 200° C and reaction times of more than 1 hour and up to about 20 hours are required. In principle, the reaction according to the invention can also be carried out in solution.

Before or during the reaction, a blowing agent for the manufacture of foams can also be added.

The crystalline, crosslinked plastic products are as a rule manufactured with simultaneous shaping, to give castings, foamed articles, pressings, lacquer films, laminates, adhesive bonds and the like.

Of course, further customary additives, such as fillers, reinforcing agents, mould release agents, agents to protect against aging, flameproofing substances, dyestuffs or pigments, can be added to the moulding compositions.

Suitable fillers or reinforcing agents are fibrous or pulverulent inorganic or organic substances. Quartz powder, aluminium oxide trihydrate, mica, aluminium powder, iron oxide, ground dolomite, chalk powder, gypsum, slate powder, unburnt kaolin (bolus), burnt kaolin, glass fibres, boron fibres and asbestos fibres may be mentioned. A content of materials, in the form of fibres and powders, which assist the heat conductivity can prove particularly advantageous. Examples of such materials are metals (for example aluminium powder), carbon, such as carbon black and graphite in powder form, and carbon fibres.

For the purpose of optimum and accelerated development of the crystal structure of the polymers it is also advisable to add nucleating agents, such as phthalocyanines, carbon black, α-naphthoic acid or the like.

The epoxide resins which can be manufactured according to the invention can also be used, apart from for the manufacture of mouldings and laminates with glass, metal or the like, for the manufacture of foamed articles.

A particular use for the new epoxide resins is as material which absorbs solar energy in collectors for the storage of solar energy. In such solar collectors, very severe thermal cycling arises, which, in the collectors of the state of the art, can lead, as a result of the different materials having different coefficients of thermal expansion, to dilatation stresses, deformations and the formation of cracks. When the epoxide resins manufactured according to the invention are used, for example, as a potting material for metallic tubes and fins, such as are used in heat exchangers, these disadvantages do not arise.

For this special application, the crystalline, crosslinked, elastomeric epoxide resins are preferably dyed black (with at most up to 20% by weight of colorant, preferably carbon black).

The crystalline, crosslinked, elastomeric epoxide resins which can be manufactured by the process according to the invention are also a further subject of the invention.

EXAMPLE 21.9 g of an acid polyester obtained from 5 mols of decanedicarboxylic acid and 4 mols of dodecanediol (equivalent weight = 832) and 16.8 of an acid polyester obtained from 4 mols of dimerised ricinoleic acid and 3 mols of hexanediol (equivalent weight 1,280) and 3.5 g of dodecenylsuccinic anhydride are warmed to 120° C and mixed well with 7.4 g of the cycloaliphatic diepoxide compound of the following structure:

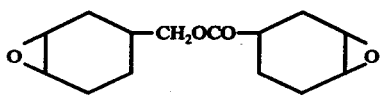

(equivalent weight 141) and 0.1 g of dimethylbenzylamine and the mixture is poured into the pre-warmed moulds, analogously to Example 1. (Equivalent ratio = 1.0:0.5:0.5:2.0).

After curing for 16 hours at 140° C, mouldings with the following properties are obtained:

| Tensile strength | = 8 N/mm² |
|---|---|
| Elongation at break | = 141% |
| $T_m$ | = 55° C |
| Resistance to tear propagation | = 101 N (DIN 53,363). |

We claim:

1. Process for the manufacture of crystalline, crosslinked, elastomeric epoxide resins, characterised in that epoxide compounds, containing two or more epoxide groups, are reacted
   a. with polyester-polycarboxylic acids A which essentially contain segments of the formula I $$-[O-(CH_2)_n-O.CO-(CH_2)_m-CO]_p- \quad (I)$$

in which n and m are identical or different and denote 2 or a higher number than 2, and to which the condition n + m = 6 to 30 applies, and in which p denotes a number from 2 to 40 which, however, is sufficiently large that the segment contains at least 30 —CH₂— groups, and
   b. with polyester-polycarboxylic acids B which essentially contain segments of the formula II $$-[O-R^1-O.CO-R^2-CO]_q- \quad (II)$$

in which R¹ denotes an alkylene radical with at least 2 C atoms in the chain, in which R² denotes a radical which is derived from a dimerised monounsaturated or di- unsaturated fatty acid, and in which, per O bridge, an average of at least 3.5 and at most 30 C atoms, without taking into account the C atoms of the —CO.O— radicals, are present in the chain, and in which q denotes a number from 2 to 40, which, however, is sufficiently large that the segment contains at least 30 C atoms, without taking into account the C atoms of the —CO.O— radicals, in the chain, and c. if appropriate, with curing agents C, and, if appropriate, in the presence of accelerators, in a ratio such that 0.5 to 1.2 equivalents of polyester-polycarboxylic acid are present per equivalent of epoxide compound, that 1/10 to 9/10 of these 0.5 to 1.2 equivalents are attributable to the polyester-polycarboxylic acid A and the remaining 9/10 to 1/10 to the polyester-polycarboxylic acid B, and that up to 0.6 equivalent of curing agent C is present per equivalent of epoxide compound, with the proviso that, in the cases in which only difunctional epoxide compounds and difunctional polyester-polycarboxylic acids A and B are employed, the epoxide groups must be present in excess and the reaction with a curing agent C is essential.

2. Process according to claim 1, characterised in that the reactants are reacted in a ratio such that 0.7 to 1.2, preferably 0.9 to 1.1, equivalents of polyester-polycarboxylic acid are present per equivalent of epoxide compound.

3. Process according to claim 1, characterised in that the reaction is preferably carried out for 1 to 20 hours in the melt at temperatures between 50° and 200° C.

4. Process according to claim 1, characterised in that a single epoxide compound is reacted.

5. Process according to claim 1, characterised in that several epoxide compounds are reacted.

6. Process according to claim 1, characterised in that the epoxide compounds employed are those of the group comprising triglycidyl isocyanurate and triglycidyl compounds which contain one or more hydantoin groups and/or dihydrouracil groups, especially the epoxide compound of the formula III

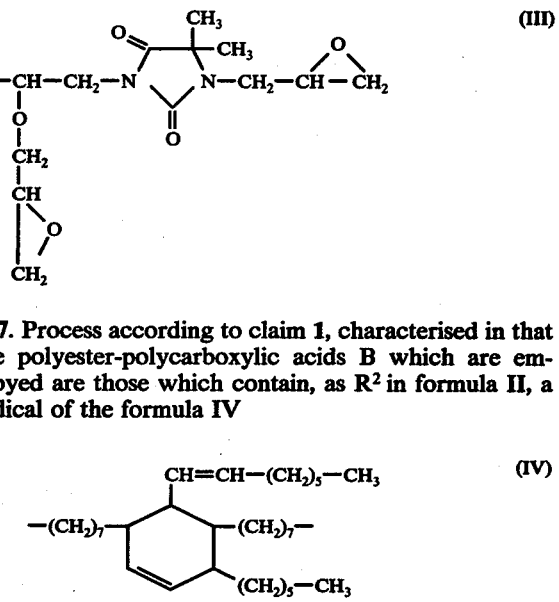

7. Process according to claim 1, characterised in that the polyester-polycarboxylic acids B which are employed are those which contain, as R² in formula II, a radical of the formula IV

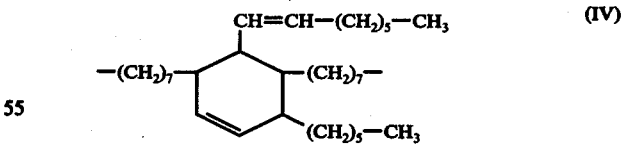

8. Process according to claim 1, characterised in that polyester-dicarboxylic acids are employed as polyester-polycarboxylic acids A and/or B.

9. Process according to claim 1, characterised in that the polyester-polycarboxylic acids A and/or B which are employed are those which contain at least 3 carboxyl groups.

10. Process according to claim 1, characterised in that at least one adduct containing epoxide groups is manufactured, in a 1st stage, from the epoxide compounds and the polyester-polycarboxylic acids A and/or B, preferably using 0.5 to 1 equivalent of polyester-polycarboxylic acid per 2 equivalents of epoxide compounds, and, in a second stage, is crosslinked with the remaining polyester-polycarboxylic acids and/or curing agents, optionally after the addition of further epoxide compounds.

11. Process according to claim 1, characterised in that the polyester-polycarboxylic acids A and/or B employed are preferably polyester-dicarboxylic acids and the epoxide compounds employed are those containing at least 3 epoxide groups.

12. Process according to claim 1, characterised in that the polyester-carboxylic acids A and/or B employed are those containing at least 3 carboxyl groups, preferably polyester-tricarboxylic acids and/or polyester-tetracarboxylic acids, and the epoxide compounds employed are preferably diepoxide compounds.

13. Process according to claim 11, characterised in that the reaction is carried out using a ratio such that approximately 1 equivalent of polyester-carboxylic acid is present per equivalent of epoxide compound and in that no curing agent C is employed.

14. Process according to claim 11, characterised in that the reaction is carried out using an excess of epoxide groups, compared with the —CO.OH groups of the polyester-polycarboxylic acids, and that a curing agent is also used, preferably in an amount which is required for the crosslinking reaction of the excess epoxide groups.

15. Process according to claim 1, characterised in that the polyester-polycarboxylic acids A and B employed are polyester-dicarboxylic acids and the epoxide compounds employed are those containing 2 epoxide groups.

16. Process according to claim 15, characterised in that the reaction is carried out in a single stage using a ratio such that approximately 0.6 to 0.9 equivalent of polyester-carboxylic acid is present per equivalent of epoxide compound and in that a carboxylic acid anhydride is also used, preferably in an amount which is required for the crosslinking reaction of excess epoxide groups, as the curing agent.

17. Process according to claim 15, characterised in that at least one adduct containing epoxide groups is manufactured, in a first stage, from the epoxide compounds and the polyester-polycarboxylic acids A and/or B, preferably using 1 equivalent of polyester-polycarboxylic acid per 2 equivalents of epoxide compound, and, in a second stage, is crosslinked by reaction with customary curing agents.

18. Process according to claim 1, characterised in that nucleating agents, preferably phthalocyanines and/or α-naphthoic acid, are added to the reaction mixture, before or during the reaction.

19. Process according to claim 1, characterised in that fillers, preferably substances which assist the heat conductivity, such as aluminium, carbon black and graphite, are added to the reaction mixture before or during the reaction.

20. Crystalline, crosslinked, elastomeric epoxide resins manufactured by the process according to claim 1.

* * * * *